(12) United States Patent
Szász et al.

(10) Patent No.: US 11,470,124 B2
(45) Date of Patent: Oct. 11, 2022

(54) TECHNIQUE FOR ACQUIRING AND CORRELATING SESSION-RELATED INFORMATION FROM AN INTERNET PROTOCOL MULTIMEDIA SUBSYSTEM

(71) Applicant: Telefonaktiebolaget LM Ericsson (publ), Stockholm (SE)

(72) Inventors: Ferenc Szász, Budapest (HU); Attila Báder, Paty (HU); Attila Mitcsenkov, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/048,515

(22) PCT Filed: Apr. 18, 2018

(86) PCT No.: PCT/EP2018/059903
§ 371 (c)(1),
(2) Date: Oct. 16, 2020

(87) PCT Pub. No.: WO2019/201435
PCT Pub. Date: Oct. 24, 2019

(65) Prior Publication Data
US 2021/0194936 A1     Jun. 24, 2021

(51) Int. Cl.
*H04L 65/1016* (2022.01)
*H04L 41/0631* (2022.01)
(Continued)

(52) U.S. Cl.
CPC ...... *H04L 65/1016* (2013.01); *H04L 41/0631* (2013.01); *H04L 65/102* (2013.01);
(Continued)

(58) Field of Classification Search
CPC ............. H04L 65/1016; H04L 41/0631; H04L 65/102; H04L 65/105; H04L 65/1069;
(Continued)

(56) References Cited

U.S. PATENT DOCUMENTS 8,331,384 B2 * 12/2012 Ghai ................... H04W 12/037
370/401
9,788,181 B2 * 10/2017 Edge ................. H04M 1/72418
(Continued)

FOREIGN PATENT DOCUMENTS

EP        2219323 A1      8/2010
WO    20170037598 A1     3/2017

OTHER PUBLICATIONS

International Search Report and the Written Opinion of the International Searching Authority, issued in corresponding International Application No. PCT/EP2018/059903, dated Dec. 21, 2018, 11 pages.

*Primary Examiner* — Brian Whipple
*Assistant Examiner* — Tony Williams
(74) *Attorney, Agent, or Firm* — Rothwell, Figg, Ernst & Manbeck, P.C.

(57) ABSTRACT

A technique for acquiring and correlating session-related information from an Internet Protocol Multimedia Subsystem, IMS, is described. The technique comprises the acquisition of control plane information from control plane signalling tapped at an IMS control entity, the acquisition of user plane information from user plane traffic tapped at an IMS user plane entity, and the acquisition of context information from tapped signalling between the IMS control entity and the IMS user plane entity. The acquired context information permits to correlate the control plane information and the user plane information acquired for a particular session.

19 Claims, 7 Drawing Sheets

(51) Int. Cl.
*H04L 65/102* (2022.01)
*H04L 65/1045* (2022.01)
*H04L 65/1069* (2022.01)
*H04L 65/1083* (2022.01)
*H04M 3/22* (2006.01)
*H04M 7/00* (2006.01)

(52) U.S. Cl.
CPC ...... *H04L 65/1045* (2022.05); *H04L 65/1069* (2013.01); *H04L 65/1086* (2013.01)

(58) Field of Classification Search
CPC ..... H04L 65/1086; H04L 29/06; H04L 12/24; H04M 7/00; H04M 3/2281; H04M 7/0084
USPC ......................................................... 370/352
See application file for complete search history.

(56) References Cited

U.S. PATENT DOCUMENTS

| | | | |
|---|---|---|---|
| 2015/0063346 A1* | 3/2015 | Eswara | H04L 65/1016 370/352 |
| 2017/0214790 A1* | 7/2017 | Sun | H04L 43/12 |
| 2018/0089328 A1* | 3/2018 | Bath | G06F 16/2455 |

* cited by examiner

TECHNIQUE FOR ACQUIRING AND CORRELATING SESSION-RELATED INFORMATION FROM AN INTERNET PROTOCOL MULTIMEDIA SUBSYSTEM

CROSS REFERENCE TO RELATED APPLICATION(S)

This application is a 35 U.S.C. § 371 National Phase Entry Application from PCT/EP2018/059903, filed Apr. 18, 2018, designating the United States, the disclosure of which is incorporated herein by reference in its entirety.

TECHNICAL FIELD

The present disclosure generally relates to a technique for acquiring and correlating session-related information, for example in the context of network analytics. The technique may be implemented in the form of an acquiring/correlating system, a method, a computer program product or a cloud computing system.

BACKGROUND

In legacy radio access networks such as Wideband Code Division Multiple Access (WCDMA) and Global System for Mobile communications (GSM) networks, voice services are handled in the circuit switched (CS) domain. The CS domain provides guaranteed transport services for voice which is very sensitive to packet-level transmission characteristics, including delay and loss or jitter.

Modern radio access networks such as Long Term Evolution (LTE) networks were originally designed for high speed data transfer and do not have a CS domain. Still, there is a strong motivation to introduce voice services over LTE networks. Voice over LTE (VoLTE) is much more bandwidth efficient than WCDMA and GSM voice services.

LTE-based radio access networks interface with the Evolved Packet Core (EPC). EPC is an Internet Protocol- (IP-) based multi-service core network capable of providing mobility management and end-to-end service delivery for user traffic. EPC is a split architecture network, which means that the control and user planes are separated and handled by different network entities. The EPC comprises a Serving Gateway (SGW) towards the radio access network, while a Packet Data Network Gateway (PGW) connects the EPC to IP networks, such as the IP Multimedia Subsystem (IMS). IMS provides control and media functions for VoLTE and other real-time services.

The complex network architecture and the variety of network functionalities involved in providing services in modern radio access networks require sophisticated network analytics for performance monitoring and troubleshooting. Network analytics therefore is a prerequisite for maintaining network operability and service level guarantees.

Network nodes usually have performance management functions that are based on statistical counters. These counters aggregate information over time and may further be aggregated across other dimensions, such as cells, users or services. Counter-based network analytics solutions thus operate on the basis of aggregated information. Therefore, they are not suitable for troubleshooting individual single-user or multiple-user sessions (e.g., for individual VoLTE calls) and less suitable for root cause analysis of network errors.

Event-based performance management functions collect and correlate event data from network interfaces. Network nodes also generate event data in the form of streaming events or network logs. Such event data contain more detailed information about the network operation than statistical counters. The main challenges of event-based network analytics are the proper acquisition and correlation of high data volumes.

Certain event-based VoLTE analytics solutions acquire control plane information within the IMS system and tap user plane information between the two gateway nodes SGW and PGW or at the S1-U interface towards the LTE network. At these tapping points, the required information in regard to user plane traffic (e.g., the required header fields) is accessible in an unencrypted form and the appropriate user identities for correlating the acquired control and user plane information are available. The main drawback of such solutions is the fact that the traffic volume at the gateway nodes is very high, often several 100 Gbps, since the gateways handle not only VoLTE user plane traffic but all mobile data traffic as well. So even if the analytics solution is intended only for VoLTE, both VoLTE packets and non-VoLTE packets still have to be acquired and separated. This packet acquisition and separation would require networking and processing capacity corresponding to 20-30 powerful generic servers in each core network site, which is too expensive for mere VoLTE analytics.

Other VoLTE analytics solutions acquire the user plane information at the Mb core interface of the PGW and correlate the control and user plane information offline.

The Mb core interface, however, is a node-internal interface not needed for regular operation and, therefore, typically not available to external probing systems. This means that the user plane information cannot be acquired for VoLTE-to-VoLTE calls handled by the same node instance. This also means that, for example, voice quality key performance indicators are not available for about 50% of such calls.

SUMMARY

Accordingly, there is a need for a more efficient technique for acquiring and correlating session-related information, that avoids one or more of the above drawbacks, or other drawbacks.

According to one aspect, a system for acquiring and correlating session-related information from an Internet Protocol Multimedia Subsystem (IMS) is provided. The system is configured to acquire control plane information from control plane signalling tapped at an IMS control plane entity, to acquire user plane information from user plane traffic tapped at an IMS user plane entity, to acquire context information from tapped signalling between the IMS control plane entity and the IMS user plane entity, and to correlate the control plane information and the user plane information acquired for a particular session using the acquired context information.

The system may comprise one or more probes for tapping one or more of the control plane signalling, the user plane traffic and the signalling between the IMS control plane entity and the IMS user plane entity. Alternatively, or in addition, the system may comprise one or more interfaces for receiving one or more of the tapped control plane signalling, the tapped user plane traffic and the tapped signalling between the IMS control plane entity and the IMS user plane entity. Each such interface may be coupled to an associated probe that performs the actual tapping.

In one variant, the acquired control plane information comprises at least one of a port and an IP address of an access gateway. For example, the acquired control plane information may comprise an at least locally unique combination of an access gateway port and an access gateway IP address. The acquired user plane information may comprise at least one of a port and an IP address of a user terminal. For example, the acquired user plane information may comprise an at least locally unique combination of a user terminal port and a user IP address.

The acquired context information may establish a mapping between at least one of the port and IP address of the access gateway and at least one of the port and the IP address of the user terminal. For example, the acquired context information may establish a mapping between an at least locally unique combination of an access gateway port and an access gateway IP address on the one hand and an at least locally unique combination of a user terminal port and a user terminal IP address on the other hand.

The IMS user plane entity at which the user plane traffic is tapped may be an access gateway. The access gateway at which the user plane traffic is tapped may be identical to the access gateway identified by the access gateway port and/or access gateway IP address in the acquired control plane information.

The correlation based on IP addresses and/or ports may be performed for a particular session for an originating leg and a terminating leg of a call associated with the particular session. As such, an originating user terminal of the particular session may be associated with a first access gateway and a terminating user terminal of the particular session may be associated with a second access gateway.

The IMS control plane entity at which the control plane signalling is tapped may be a Proxy Call Session Control Function (P-CSCF). The P-CSCF may take the role of a Session Initiation Protocol (SIP) proxy that is the first point of contact within the IMS for the user terminal identified by the user terminal port and/or user terminal IP address comprised by the acquired user plane information.

The acquired control plane information may related to IMS sessions. In a similar manner, the acquired user plane information may relate to data flows of the IMS sessions. The acquired context information may permit to correlate at least one IMS session and at least one data flow underlying the particular session.

The tapped signalling between the IMS control plane entity and the IMS user plane entity may relate to setup of the particular session (e.g., to setup of an IMS session underlying a VoLTE call). Session setup may be triggered by an SIP message.

The tapped signalling between the IMS control plane entity and the IMS user plane entity may conform to ITU-T H.248 (also called MEGACO or simply H.248). H.248 signalling may be based on transaction-based request and replay messages.

The tapped signalling between the IMS control plane entity and the IMS user plane entity may generally involve a transaction-based exchange of two or more messages between the IMS control plane entity and the IMS user plane entity. In such a transaction-based scenario, the system may be configured to acquire the context information for the particular session from two or more messages belonging to a single transaction (e.g., from a request message and from an associated reply message). The two or more messages may generally comprise one message indicative of at least one of a port and an IP address of a user terminal and another message indicative of at least one of a port and an IP address of an access gateway servicing the user terminal. Corresponding aspects of the ports and IP addresses have already been discussed above in regard to the acquired control and user plane information.

In one variant, the system is configured to continuously evaluate, or monitor, the tapped signalling between the IMS control plane entity and the IMS user plane entity in regard to the context information previously acquired for a particular session. Such a continuous evaluation, or monitoring, may be performed to update or remove the context information previously acquired for the particular session. As an example, the context information may be removed in case a particular IMS session underlying a particular call between two user terminals is terminated. As a further example, the context information may be updated in case of a port change and/or an IP address change in regard to one or both of the access gateway and the user terminal involved in the particular session.

The acquired session-related information may relate to voice over IP or video over IP sessions. The acquired session-related information is generally independent of the media type underlying the session. In principle, the acquired session-related information may relate to any user traffic involving the IMS, including GSM, WCDMA, LTE and 5G user traffic handled by the IMS.

The system may be configured to tap the control plane signalling at an Mw interface. Additionally, or in the alternative, the system may be configured to tap the user plane signalling at an Mb interface. The Mb interface may in particular be an Mb access interface within the IMS. As an example, the Mb interface may be located at an IMS access gateway and face a packet gateway outside the IMS.

The system may be configured to tap the signalling between the IMS control plane entity and the IMS user plane entity at an Iq interface. The Iq interface may belong to the IMS control plane entity or to the IMS user plane entity.

The IMS control plane entity and the IMS user plane entity may be co-located at a single IMS site. In particular, the tapped Mb interface, the Mb interface and the tapped Iq interface may be co-located at this single IMS side.

Also provided is a network monitoring system comprising the acquisition/correlation system presented herein that is configured to perform correlations for multiple sessions. The network monitoring system further comprises a network analytics component configured to individually analyse each of the multiple sessions based on the associated correlation.

The networks analytics component may be configured to one or more of: determine one or more key performance indicators of the network based on the correlated information, maintain one or more statistical counters based on the correlated information, perform root-cause analysis based on the correlated information, and generate event data based on that correlated information. The network analytics component may be coupled to the acquisition/correlation system via one or more interfaces.

According to a further aspect, a method for acquiring and correlating session-related information from an IMS is provided. The method comprises acquiring control plane information from control plane signalling tapped at an IMS control plane entity, acquiring user plane information from user plane traffic tapped at an IMS user plane entity, acquiring context information from tapped signalling between the IMS control plane entity and the IMS user plane entity, and correlating the acquired control plane information and the acquired user plane information for a particular session using the acquired context information.

The method may be performed by the acquisition/correlation system and/or the network monitoring system presented herein. The method may comprise further steps, routines or procedures as generally described herein.

Also provided is a computer program product comprising program code portions for performing the steps of any of the method aspects presented herein when executed by one or more processing devices. The computer program product may be stored a computer-readable recording medium. The computer program product may also be provided for download via a network connection.

Also presented is a cloud computing system configured to perform any of the method aspects presented herein. The cloud computing system may comprise distributed cloud computing resources that jointly perform the method aspects presented herein.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
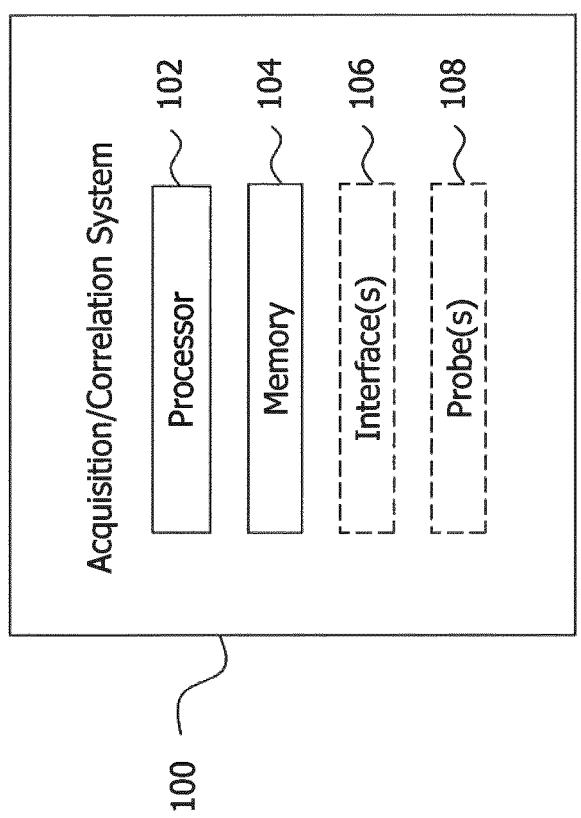
FIG. 1 illustrates a first embodiment of an acquisition/correlation system.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on voice services, the present disclosure can also be implemented in connection with video services or other multimedia services handled by an IMS. Moreover, while certain aspects in the following description will exemplarily be described in connection with LTE networks, the present disclosure is not restricted to any specific access network type.

Those skilled in the art will further appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 illustrates an embodiment of a system 100 configured to acquire and correlate session-related information from an IMS (not shown). The system 100 may be implemented within the IMS (i.e., as part of an IMS function) or outside the IMS. Moreover, one or more components of the system 100 may be implemented within the IMS and one or more further components of the system 100 may be implemented outside the IMS.

The system 100 may be configured as a stand-alone computer or as a distributed computing system. In some implementations, the system 100 may be configured as a cloud computing system.

As illustrated in FIG. 1, the system 100 comprises at least one processor 102 and at least one memory 104 coupled to the processor 102. Optionally, the system 100 may further comprise one or more interfaces 106 and/or one or more probes.

The processor 102 is configured to acquire control plane information, user plane information as well as context information. Moreover, the processor 102 is configured to correlate the control plane information and the user plane information acquired for a particular session using the acquired context information. The acquisition and correlation operations are performed by the processor 102 under control of program code stored in the memory 104.

The processor 102 can acquire the control plane information, the user plane information and the context information in various ways. For example, these items of information may be read from the memory 104 or received via the one or more interfaces 106 or from the one or more probes 108. In one implementation, a first of the probes 108 taps control plane signaling at an IMS control plane entity, a second of the probes 108 taps user plane traffic at an IMS user plane entity, and a third of the probes taps signaling between the IMS control plane entity and the IMS user plane entity. The probes 108 are coupled (optionally via the one or more interfaces 106) to one or both of the memory 104 and the processor 102. In this way, the processor 102 can access the tapped control plane signaling, the tapped user plane traffic and the tap signaling between the IMS control plane entity and the IMS user plane entity to acquire the control plane information, the user plane information and the context information, respectively.

By having the probes 108, and thus the tapping points, installed only on a single IMS site, the complexity of acquiring session-related information for correlation purposes can be reduced. In certain implementations, the need for deploying multiple acquisition/correlation servers at multiple sites inside and outside the IMS can thus be eliminated. Moreover, data acquisition and correlation can easily be performed for both an originating leg and a terminating leg of a particular call associated with a particular session.

As explained above, a network analytics solution tapping the control plane at the S1-U interface or between the SGW and PGW requires networking and processing capacity corresponding to 20-30 powerful generic servers in each core network site. By comparison, capturing the VoLTE-related control plane signaling at a single site within the IMS requires only one average server per IMS site as the VoLTE user plane is only around 5% of the total traffic.

Figure 2:
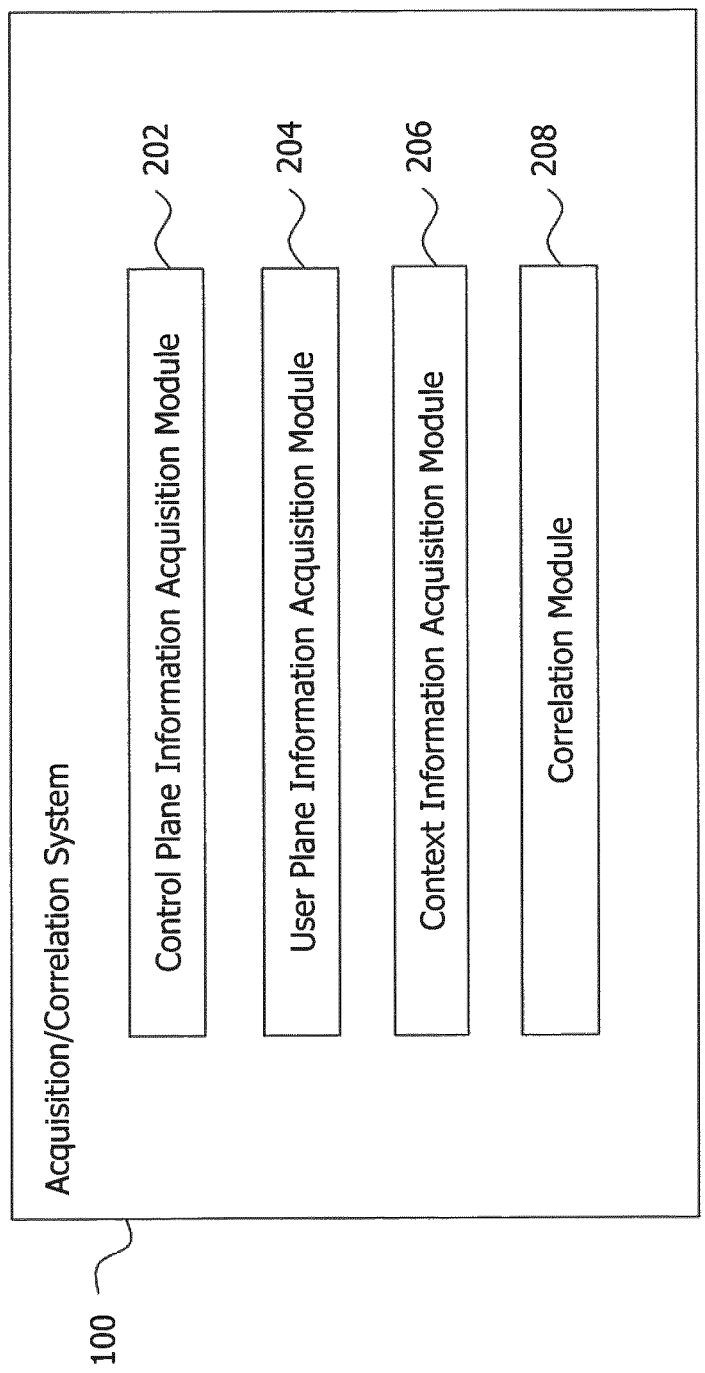
FIG. 2 illustrates a second embodiment of an acquisition/correlation system.

FIG. 2 illustrates a modular implementation of a system 100 for acquiring and correlating session-related information. As illustrated in FIG. 2, the system 100 comprises a control plane information acquisition module 202, a user plane information acquisition module 204, a context information acquisition module 206 as well as a correlation module 208. The correlation module 208 may be co-located with the acquisition modules 202, 204 and 206 at a single site or may be located at a remote site and coupled to the acquisition modules 202, 204 and 206 via a network connection or physical lines.

The acquisition module 202 is configured to acquire control plane information from control plane signaling tapped at an IMS control plane entity. The acquisition module 204 is configured to acquire user plane information from user plane traffic tapped at an IMS user plane entity. The acquisition module 206 is configured to acquire context information from tapped signaling between the IMS control plane entity and the IMS user plane entity. The acquisition modules 202, 204 and 206 may be implemented as individual probes at a single IMS site or as interfaces to such probes or as a processor coupled to such interfaces (as generally described above with reference to FIG. 1).

The correlation module 208 is configured to correlate the control plane information and the user plane information acquired by the acquisition modules 202, 204, respectively, for a particular session using the context information acquired by the acquisition module 206. The correlation module 208 may be configured as a processor having access to the control plane information, user plane information and context information acquired by the acquisition modules 202, 204 and 206, respectively.

Figure 3:
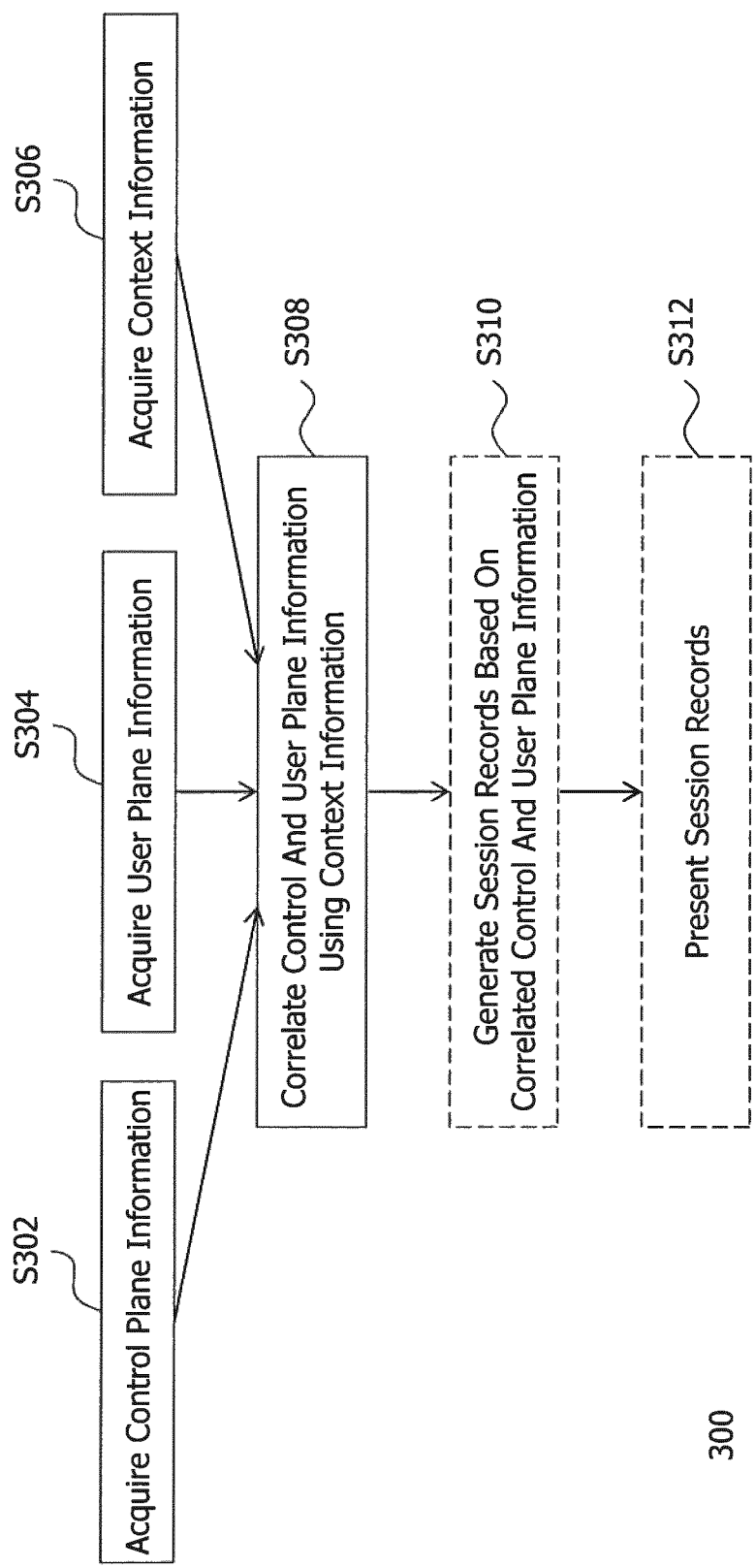
FIG. 3 illustrates a flow diagram of a method embodiment for acquiring and correlating information in an IMS.

FIG. 3 illustrates a flow diagram 300 of a method embodiment for acquiring and correlating session-related information from an IMS. The method embodiment may be performed by any of the systems 100 described above with reference to FIGS. 1 and 2 or any of the further acquisition/correlation systems described below.

As illustrated in FIG. 3, the method starts with acquisition of control plane information, user plane information and context information in steps S302, S304 and S306, respectively. These three acquisition steps may be performed in any order and also in parallel. Moreover, these acquisition steps may be performed continuously. As explained above with reference to FIGS. 1 and 2, control plane information is acquired from control plane signaling tapped at an IMS control plane entity, user plane information is acquired from user plane traffic tapped at an IMS user plane entity, and context information is acquired from tapped signaling between the IMS control plane entity and the IMS user plane entity.

In a further step S308, the control plane information acquired in step S302 is correlated with the user plane information acquired in step S304 using the context information acquired in step S306. In one variant, the control plane information acquired in step S302 comprises at least one of a port and an IP address of at least one IMS access gateway and the user plane information acquired in step S304 comprises at least one of a port and an IP address of at least one IMS-enabled user terminal. In such a scenario, the context information acquired in step S306 establishes a mapping between at least one of the port and the IP address of an access gateway involved in a particular session and at least one of the port and the IP address of a user terminal also involved in that particular session. In this manner, informational items in the control plane information for the particular session can be associated with informational items in the user plane information of that particular session for network analytics purposes.

It should be noted that the correlation may separately or jointly be performed for an originating and a terminating leg of a call associated with the particular session based on the associated ports and IP addresses of originating and terminating user terminals and associated access gateways, respectively.

In an optional step S310, one or more session records can be generated that include informational content from the correlated control and user plane information acquired for a plurality of sessions. In a further optional step S312, the session records generated in step S310 are presented or otherwise utilized for network analytics (including network management) purposes. Such session records are sometimes also referred to as call records, for example in case the records are associated with a voice or multimedia call between two user terminals.

Figure 4:
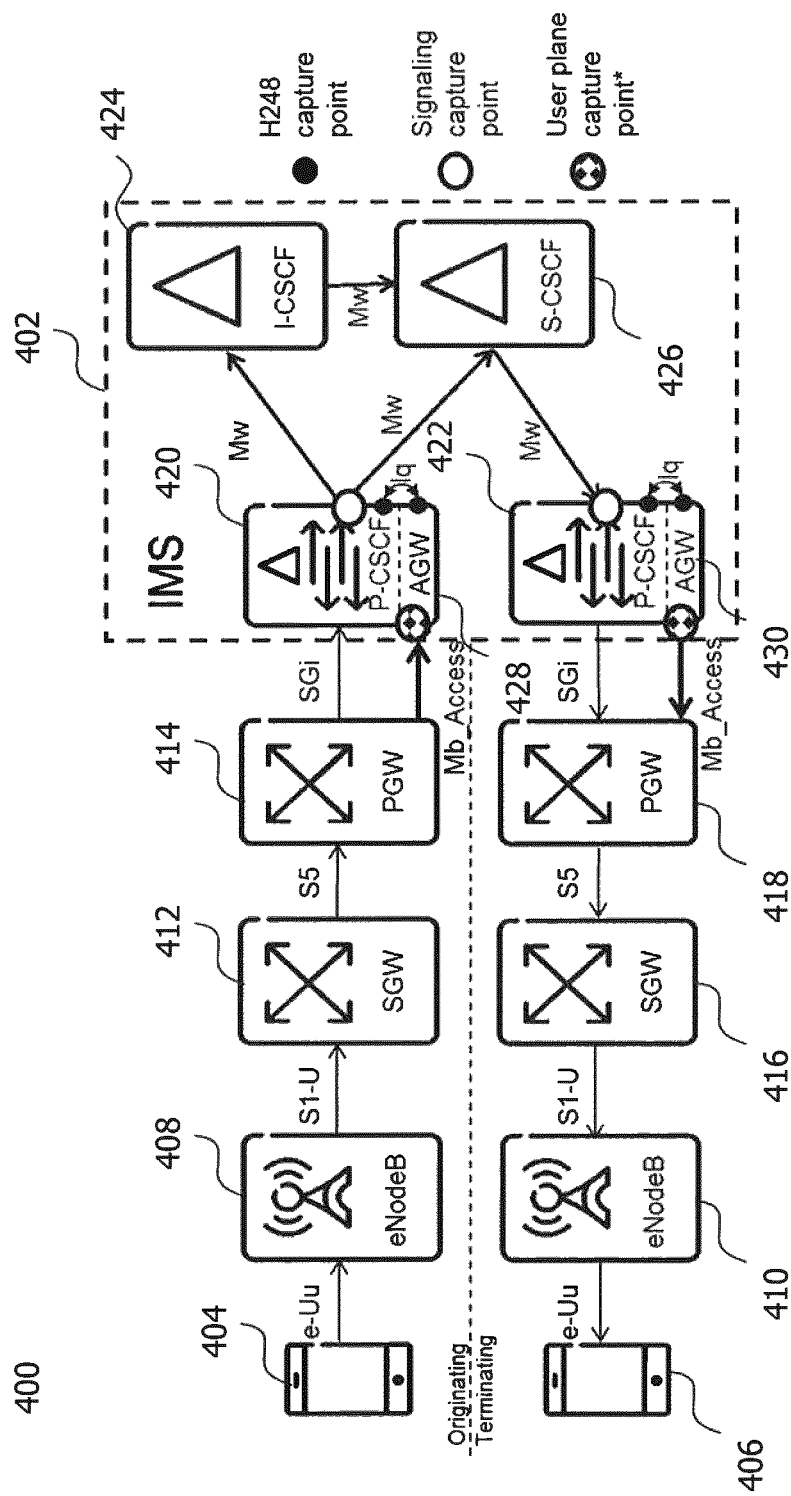
FIG. 4 illustrates exemplary tapping points in an IMS according to one embodiment.

FIG. 4 illustrates a network system 400 in which the present disclosure can be practiced. Specifically, FIG. 4 illustrates an IMS 402 as well as the various tapping points within the IMS 402 to acquire control plane information, user plane information and context information so as to practice the acquisition and correlation aspects described above with reference to FIGS. 1 to 3.

FIG. 4 shows a voice or multimedia call from a first user terminal 404 (originating user terminal) to a second user terminal 406 (terminating user terminal) stretching through the IMS 402. Call-handling by the IMS 402 involves establishment of a dedicated session for that call by the IMS 402.

Each of the two user terminals 404, 406 is attached via a e-Uu interface to an associated radio access network 408, 410. In the present embodiment, the two radio access networks 408, 410 both conform to LTE and comprise an eNodeB. It will in the following be assumed that the call from the user terminal 404 to the user terminal 406 is a VoLTE call.

Each of the two radio access networks 408, 410 is coupled via a S1-U interface to an associated EPC with an SGW 412 and an PGW 414 as well as an SGW 416 and PGW 418, respectively. Each SGW 412, 416 is coupled to the associated PGW 414, 418 via an S5 interface.

The IMS 402 generally provides control and media functions for voice, video and other real-time multimedia services. To this end, the IMS 402 includes multiple Call Session Control Functions (CSCFs) 420, 422, 424, 426. Additionally, the IMS 402 comprises two or more Access Gateways (AGWs) 428, 430.

The P-CSCFs 420, 422 and AGWs 428, 430 are the IMS edge nodes towards the EPC and include network interworking functionalities (such as one or more of network address translation, protocol translation, media translation, security and quality of service support). As shown in FIG. 4, the P-CSCF 420 is coupled to the PGW 414 via an SGi interface and the AGW 428 is coupled to the PGW 414 via an Mb interface. In a similar manner, the P-CSCF 422 is coupled to the PGW 418 via an SGi interface and the AGW 430 as coupled to the PGW 418 via an Mb interface.

The P-CSCFs 420, 422 are SIP proxies and constitute the first contact points in the IMS 402 for the user terminals 404, 406, respectively. They act as anchor points to the IMS 402 for the terminals 404, 406 and provide, inter alia, encryption and decryption of the outgoing/incoming traffic.

The I-CSCF 424 serves as an edge node of the IP administrative domain. It has a Domain Name System (DNS) address enabling external servers to find the IMS 402. The S-CSCF 426 is a central SIP server performing session control and SIP registration. It connects the different SIP addresses and user profiles. The I-CSCF 424 and the S-CSCF 426 are interconnected via an Mb interface. In a similar manner, the I-CSCF 424 and the S-CSCF 426 are connected to the P-CSCFs 420, 422 via Mb interfaces.

The P-CSCFs 420, 422 constitute control plane entities of the IMS 402 and communicate under the control of SIP or any other control plane protocol. The AGWs 428, 430, on the other hand, constitute user plane entities of the IMS 402 and communicate under control of the Real Time Protocol (RTP) or any other user plane protocol. Each AGW 428, 430 is controlled by the associated P-CSCF 420, 422 using the H.248 (also called MEGACO) protocol as specified by the ITU-T H.248.1 recommendation. To this end, an Iq interface is provided between each P-CSCF/AGW pair 420, 428 and 422, 430, respectively.

FIG. 4 highlights exemplary tapping points (also called capture points) within the IMS 402 for acquisition of control plane information, user plane information and context information. At each of these tapping points, the respective probe 108 or acquisition module 202, 204, 206 described above with reference to FIGS. 1 and 2 can be located.

In more detail, control plane signalling is tapped at the Mw interface at one or both of the P-CSCF 420 and the P-CSCF 422. The user plane traffic is tapped at the Mb interface of one or both of the AGW 428 and the AGW 430. Importantly, the user plane traffic is tapped at the so-called "Mb_access" interface within the IMS 402 so that user plane traffic tapping can be performed with the same IMS probe system that is used for tapping the control plane signalling within the IMS 402. This approach eliminates the need to perform user plane traffic tapping outside the IMS 402 (e.g., at the S1-U or the S5 interface).

The combined tapping of both control plane signalling and user plane traffic within the IMS 402 as illustrated in FIG. 4 does not permit a straight-forward correlation of the tapped control plane signalling and the tapped user plane traffic for a particular session involving the user terminal 404 and the user terminal 406. The reason for this is the fact that for a particular call (and session), the user terminal IP address in the packet header at the Mb interface is different from the IP address in the Session Description Protocol (SDP) part of the SIP messages at the Mw interfaces within the IMS 402. For this reason, context information needs to be tapped at the Iq interface between one or both of the P-CSCF/AGW pairs 420, 428 and 422, 430, respectively, as will now be explained with reference to FIG. 5.

Figure 5:
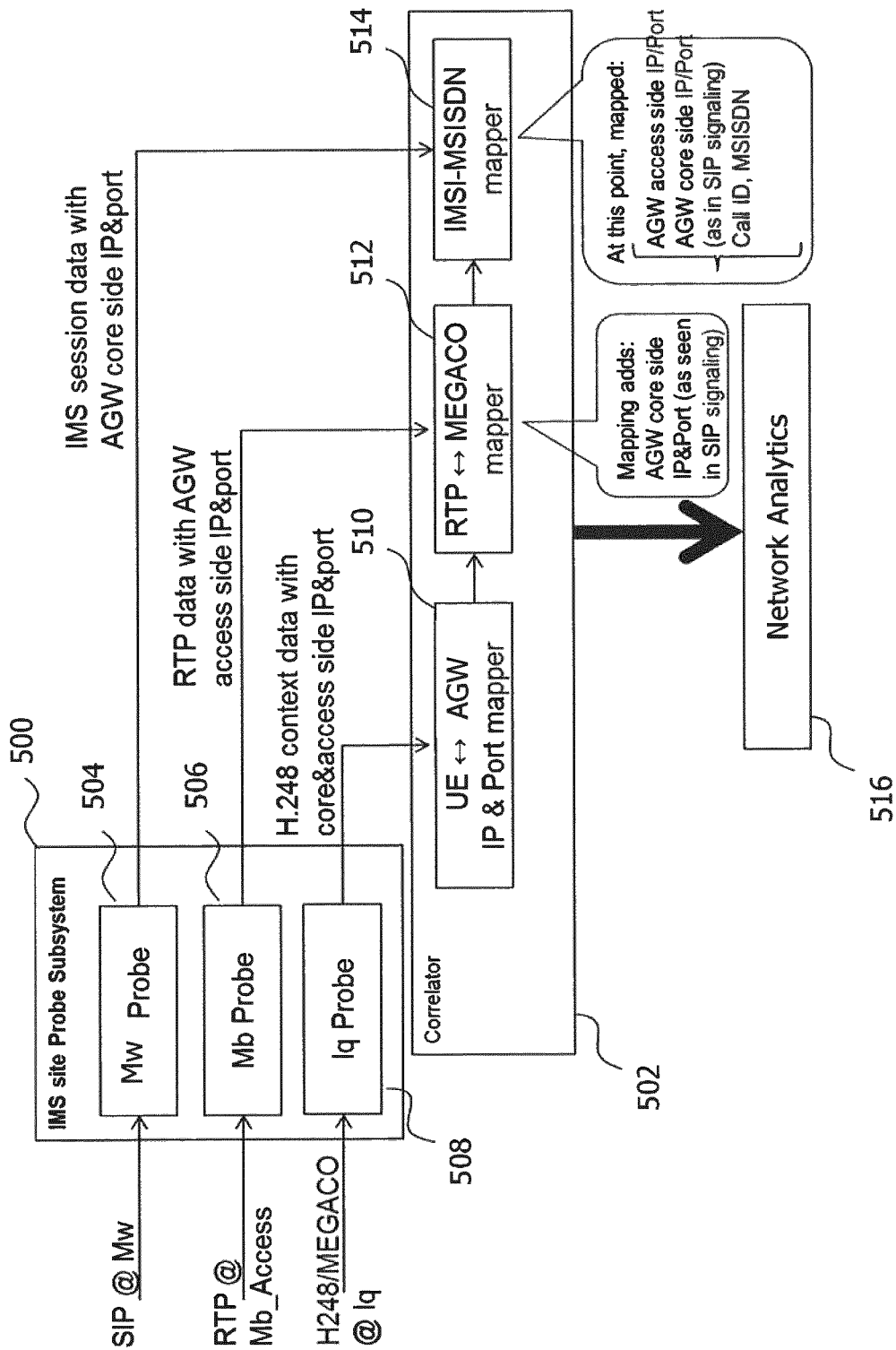
FIG. 5 illustrates an acquisition/correlation system according to a third embodiment.

FIG. 5 illustrates in more detail the probing and correlation procedures performed in the context of the IMS 402 illustrated in FIG. 4. FIG. 5 specifically illustrates a probe subsystem 500 at the site of the IMS 402 as well as a correlator 502 that may be co-located with the probe subsystem 500 at the site of the IMS 402 or remotely from the probe subsystem 500 and outside the IMS 402. The probe subsystem 500 may correspond to the probes 108 illustrated in FIG. 1 or the acquisition modules 202, 204 and 206 illustrated in FIG. 2. The correlator 502 may correspond to the processor 102 of FIG. 1 or the correlation module 208 of FIG. 2.

As shown in FIG. 5, the probe subsystem 500 comprises at least one Mw probe 504 located at at least one of the Mw tapping points illustrated in FIG. 4, at least one Mb probe 506 located at at least one of the Mb tapping points illustrated in FIG. 4, as well as at least one Iq probe 508 located at at least one of the Iq tapping points illustrated in FIG. 4. In one variant, two dedicated Mw probes 504, two dedicated Mb probes 506 and two dedicated Iq probes 508 are provided for separately acquiring information for the originating side of the IMS 402 (user terminal 404, P-CSCF 420 and AGW 428) and the terminating side of the IMS 402 (user terminal 406, P-CSCF 422 and AGW 430).

The (or each) Mb probe 504 is configured to tap SIP-based control plane signalling at an Mw interface and the (or each) Mb probe 506 is configured to tap RTP-based user plane traffic at an Mb interface. The (or each) Iq probe taps H.248-based control signalling so as to acquire context information that permits a mapping between a SIP session and an RTP flow within the IMS 402 that belong to a particular session (i.e., to the VoLTE call from the "originating" user terminal 404 to the "terminating" user terminal 406 in the scenario illustrated in FIG. 4).

The RTP flow is identified by the IP address and port of the associated user terminal 404, 406 in the transport protocol header. As explained above, this IP address and port information is different from the IP address and port of the associated AGW 428, 430 as carried in the SDP part of the SIP signalling. The associated IP address and port change is done by the respective AGW 428, 430 "pinholing" the user plane traffic, which is again controlled by the associated P-CSCF 420, 428 on the Iq interface. The one or more Iq probes 508, therefore, are basically provided to establish the RTP flow/SIP session mappings as will now be described in more detail with respect to the operation of the correlator 502 in FIG. 5. Such mappings may individually be performed for the originating side of the IMS 402 (user terminal 404, P-CSCF 420 and AGW 428) and the terminating side of the IMS 402 (user terminal 406, P-CSCF 422 and AGW 430) but eventually result in a single data record.

As also shown in FIG. 5, the correlator 502 comprises three dedicated mapping, or correlation, functions 510, 512, 514. Such a function set may individually be provided for the originating side of the IMS 402 and the terminating side of the IMS 402.

The first mapping function 510 receives H.248 context data from Iq probe 508, that permits to establish the mapping between the IP address and the port of one of the user terminals 404, 406 (also denoted as User Equipments, UEs) on the one hand and the associated AGW 428, 430, on the other hand.

The output of the mapping function 510 is input to a further mapping function 512 that additionally receives from the Mb probe 506 RTP data in association with the user terminal IP address and port. The mapping function 512 generates data records with the RTP data from the Mb probe 506 and extends these data records with the AGW address IP address and port that are mapped to the user terminal IP address and port in association with the RTP data from the Mb probe 506. This extension is based on the information received by the mapping function 512 from the mapping function 510.

The data records generated by the mapping function 512 are output to a further mapping function 514 that additionally receives IMS session data in association with AGW IP addresses and ports from the Mw probe 504. The mapping function 514 further extends the data records received from the mapping function 512 with the IMS session data having the associated AGW IP address and port. The AGW IP address and port are, for example, carried in SIP INVITE messages captured on the Mw interface. Thus, the mapping function 514 may extend the data records with the International Mobile Subscriber Identifier (IMSI), the Mobile Station International Subscriber Digital Number (MISDN) and/or further information from the IMS session data captured by the Mw probe 504.

The resulting user session-specific data records generated by the mapping function 514 are output to a network analytics component 516 for further processing. In this regard, individual data records may be generated for the originating side (see, e.g., components 420 and 428 in FIG. 4) and the terminating side (see, e.g., components 422 and 430 in FIG. 4) by the correlator 502 as explained above and output to the network analytics component 516. The individual data records for the originating and terminating sides may be correlated (and, e.g., aggregated) per session on the basis of specific identifiers available on both communication legs (e.g., identifiers of the involved user terminals 404, 406). The network analytics component 516 is illustrated in more detail in FIG. 6.

Figure 6:
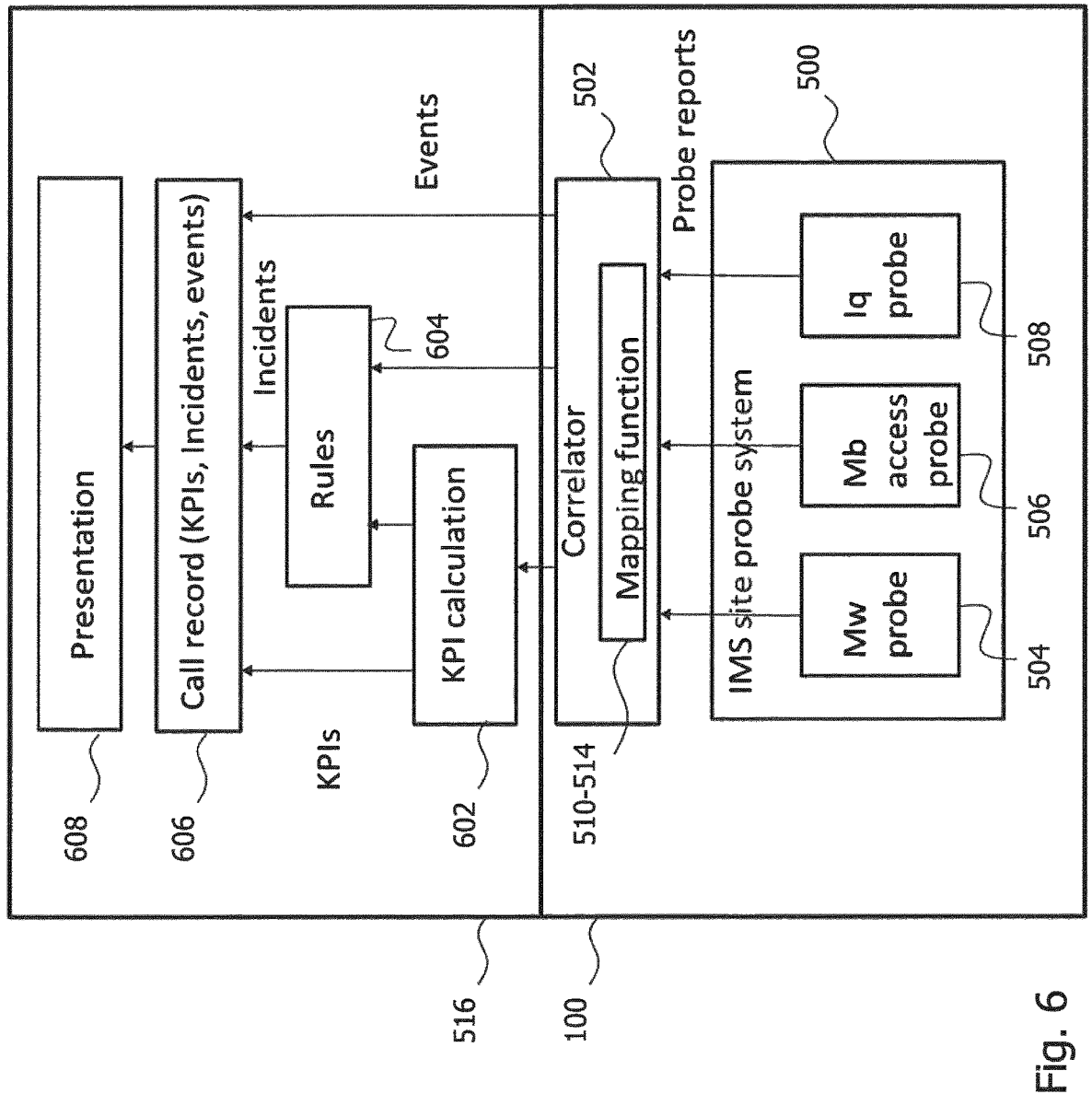
FIG. 6 illustrates a network monitoring system according to one embodiment.

As shown in FIG. 6, the network analytics component 516 is coupled to the correlator 502 which in turn is coupled to the probe system 500. In some variants, the correlator 502 and the probe system 500 together constitute an embodiment of the acquisition/correlation system 100 as described above with reference to FIGS. 1 and 2.

Referring again to FIG. 6, the network analytics component 516 receives the data records generated by the acquisition/correlation system 100 and subjects these data records to network analytics operations. Since the data records contain information on an event level, highly granular network analytics and, as a consequence, network management operations become possible.

In some variants, the data records generated by the acquisition/correlation system 100 are input to a Key Performance Indicator (KPI) calculation module 602 that calculates one or more voice quality KPIs for the exemplary VoLTE call from the user terminal 404 to the user terminal 406 illustrated in FIG. 4. Of course, other KPIs may be calculated as well from the data records received by the KPI calculation module 602. The KPIs thus calculated may be subjected to a set of one or more predefined rules in a rules module 604. Such rules may, for example, define that an incident is created when a certain KPI exceeds a predefined threshold or meets any other incident-related condition. The rules module 604 may also directly process the data records generated by the acquisition/correlation system 100 and the events included therein.

A call record generation module 606 of the networks analytics component 560 is configured to generate individual VoLTE call records by associating the KPIs, incidents and events on a call-by-call (and session-by-session) basis as needed. The call records thus generated are then fed to a presentation module 608 that is configured to visualize call (or, generally, session) statistics or alert a network operator as the need may be.

In the following, the operation of the probe subsystem 500 and the correlator 502 of FIG. 5 will be described in more detail with reference to the IMS 402 of FIG. 4 and in the context of different call procedures, including the associated key messages on the associated interfaces. Also, additional details about the Iq probe 508 and the tapped H.248 signalling will be described.

Session Setup

In case of a new session, or call, setup, the P-CSCF 420/422 receives and forwards a SIP INVITE message on the Mw interface and, by H.248 messages on the Iq interface, instructs the associated AGW 428/430 to set up the required channels for RTP media transmission (incoming on the Mb_access interface). The primary goal of this procedure is to establish a mapping between the IP address and port for RTP traffic on the user terminal 404/406 and the IP address and port created by the associated AGW 428/430, included in the SIP INVITE messages sent on the Mw interface by the P-CSCF 420/422.

The related message sequence (only the relevant messages) is shown below, with a specific focus on the Iq interface (P-CSCF 420/422↔AGW 428/430) and the Iq probe 508. There exists a minor but important difference between the originating side and the terminating side, so both cases are described here, while the non-trivial procedure of identifying the orientation (i.e., distinction between originating and terminating side AGW 428/430) is described later.

The Iq interface messages on the originating side include (see also the corresponding illustration in FIG. 7):

[Message #1] P-CSCF 420 on the originating side requests a new context with a H.248 ADD Request message, which contains the IP address and port of user terminal 404 (=UE1)

[Message #2] The respective Reply message (mapped to the Request message by a Transaction ID) carries the AGW access side IP address and port (T1), as well as the AGW core side IP address and port (T2), and also a Context ID.

The Iq interface messages on the terminating side include (see also the corresponding illustration in FIG. 7):

[Message #3] The S/P-CSCF 426/422 on the terminating side, upon receiving the SIP INVITE from the originating side, requests a new context on its AGW 430, passing the originating AGW's core side IP address and port (T2).

[Message #4] The respective Reply message (identified by the Transaction ID) carries the (terminating) AGW core side IP address and port (T3), the AGW access side IP address and port (T4), and also the context ID.

[Message #5] The terminating user terminal 406 (=UE2) answers with a SIP 183 Session Progress message that carries the user terminal IP address and port of the terminating user terminal 406 (=UE2). Upon receiving this message, the terminating P-CSCF 422 passes it to the AGW 430 in a subsequent H.248 Modify Request (identified by Context ID C2).

[Message #6] The respective Reply message does not carry any unknown, necessary information.

The Iq probe 508 on the terminating side records any Reply-Request message pair. This means that messages #1+#2, #3+#4 and #5+#6 are recorded. This signaling sequence contains the necessary mapping of user terminal and AGW IP address and port information needed for mapping the SIP signaling (or SIP session/call) to the associated RTP flow, namely:

UE1/T1 to T2 on the originating side
UE2/T4 to T3 on the terminating side

The Iq probe 508 generates a record from any Reply-Request message pair. This means that messages #1+#2, #3+#4 and #5+#6 are included in three subsequent records.

This signaling sequence contains the necessary mapping of user terminal and AGW IP address and port information needed for mapping the SIP signaling (or SIP session/call) to the associated RTP flow.

In case of a "half call" (i.e., the other leg being outside the IMS domain), one only sees the originating or terminating side, and has to map the user and AGW IP addresses and ports.

On the originating side, messages #1+#2 will be captured, and these will provide the necessary IP address and port mapping of the user terminal 404 and the AGW 428 on the originating side.

On the terminating side, the messages #3-#6 will be captured. Matching of the two call legs is not possible, but these four messages provide the IP address and port mapping of the user terminal 406 and AGW 430 on the terminating side: messages #4, #5 and #6 are grouped by the Context ID, and these three are enough for mapping purposes in view of the their transaction-based context (AGW IP address and port from message #4; user terminal IP address and port from message #5). If needed, message #3 might be added to the group by its Transaction ID equal to that of message #4.

Session Termination (Call Release)

In the "normal" case of an intentional call release by either side, a SIP BYE message is sent by the "leaving" user terminal, which is going to be responded by a SIP 200 OK from the "responding" user terminal. As the confirmation 200 OK message traverses the network and reaches the P-CSCF 420, 422 on each side, it instructs the associated AGW 428, 430 to release the terminations and the context with a H.248 Subtract Request. This Subtract Request is typically wildcarded (i.e., will release all terminations).

The related message sequence (only the relevant and necessary messages) is shown below, with focus on the Iq interface (AGW 428/430↔P-CSCF 420/422):

[Message #1] The P-CSCF on the "responding" side of the session termination, upon receiving the 200 OK from the user terminal, releases all terminations in the context with a wildcarded H.248 Subtract message (the Context ID in the request is known from the session history).

[Message #2] The H.248 Subtract Reply contains the Termination IDs of the released terminations and the Context ID as well.

[Message #3] The S/P-CSCF on the "leaving" side of the session termination, upon receiving the 200 OK from the network, releases all terminations in the context with a wildcarded H.248 Subtract message (the Context ID in the request is known from the session history).

[Message #4] The H.248 Subtract Reply contains the Termination IDs of the released terminations and the Context ID as well.

Special Procedures

There exist some special SIP procedures that may occur in the network and, hence, should be supported by the Iq probe-based SIP-RTP mapping for a particular session. In more detail, Single Radio Voice Call Continuity (SRVCC) handover, emergency calls and Wi-Fi calling are considered.

SRVCC handover takes place if, after initiating a call, either the originating or terminating part leaves service area of the Packet Switched (PS) network, and needs to connect to the CS network. SRVCC is responsible to the seamless handover of the SIP session. Most of the signaling happens in the radio domain and in SIP messages, but once the new media connection is set up, it impacts the AGW 428, 430 on both sides. For the user terminal 404, 406 subject to the handover, a new termination is created on the user side of the associated AGW 428, 430. The standard allows the temporary existence of three terminations in the context during the handover (the old and new UE-AGW connection on the user side).

Emergency calls do not bring any difference from normal calls on the Iq interface: a new context is created, terminations added on call initiation, terminations modified during the call setup and during the call, and on ending the call, the terminations are subtracted, and the context released.

In regard to Wi-Fi calling, the SIP call flow, and especially the H.248 messages on the Iq interface, are not changed by VoWiFi/Wi-Fi calling, but some additional information is carried in the messages (e.g., the PANI header for SIP Registration). The main differences are in the radio network, but once the client is registered in the IMS 402, the signaling and data flow uses the same paths and procedures as described above for VoLTE.

H.248 Protocol Details

Having described information acquisition and correlation for some exemplary call procedures above, now some more details in regard to the H.248 protocol and the associated operation of the Iq probe 508 and the correlator 502 will be discussed.

The H.248 protocol has a master-slave nature, i.e., command requests are sent in one direction (typically from the controller/P-CSCF 420, 422 to the gateway/AGW 428/430), and reply messages inform about the implementation and consequences of the command. Hence, a pair of Request and Reply messages together has full information about the "event". Therefore, the Iq probe 508 captures the procedures based on Request-Reply message pairs, i.e., records are generated upon a Request and a Reply message. The Request and Reply messages are coupled by the Transaction ID (which is unique on the gateway level).

The concept of coupling request and reply messages, and generating a single record from them, is there to save database operations. Between the Request and Reply messages on the Iq interface, no SIP messages are expected that require an updated IP address and port mapping, therefore the loss of "timeliness" because waiting for the (typically immediate) Reply message should not result in inconsistent operation of the correlation logic.

Figure 7:
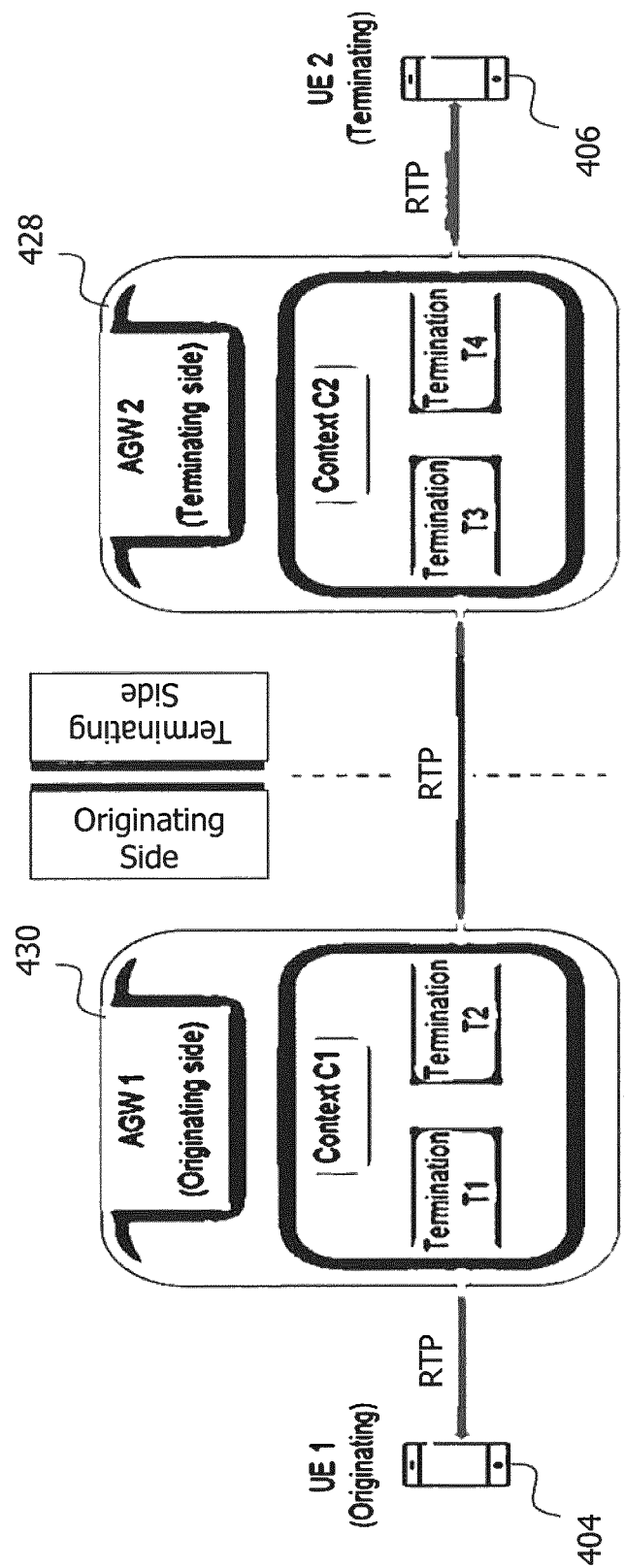
FIG. 7 illustrates data acquisition aspects in the context of H.248/MEGACO.

FIG. 7 explains how a media connection is created between the originating and terminating user terminals 404, 406, through the AGWs 428, 430 (note that the two contexts C1 and C2 in FIG. 7 may reside on the same AGW 428 or 430). A "context" generally belongs to a SIP session, with one termination towards the user terminal, and another termination towards the network (i.e., the other user terminal). Every termination has a Local Descriptor (LD) and Remote Descriptor (RD). The Local Descriptor is an SDP containing information of the termination on the gateway (e.g. IP address and port), and the Remote Descriptor is another SDP describing the "other end", to which the termination is connected to (i.e., the user terminal or another network element). H.248 messages between the AGWs 428, 430 and the associated P-CSCF 420, 422 on the Iq interface are in place to manage the contexts and to add, modify or subtract terminations within contexts.

The primary challenge is the limited information within the Iq probe 508 on the Iq interface: without having knowledge about the environment, even deciding the "directions" of the terminations (user terminal/network side) is difficult. When, for example, two new terminations are added in a context, and an RD is sent from the Controller (P-CSCF 420, 422), it might be either on the originating side (RD: user terminal IP address and port), or on the terminating side (RD: originating AGW IP address and port). Investigating the details of the H.248 messages and the related Add commands, there is almost no difference between the two sides of the call. One could observe only two elements of the H.248 ADD Request & Reply messages that may help to identify the direction of the call:

1. Within the Local Control Descriptor, the IP Real Identifier (ipdc/realm=" . . . ") in its name might refer to either the access or the core side of the AGW when adding the termination.

2. The SDP Media attribute (a="...") line exists in the Add Request for the termination without a remote descriptor on the originating side, but not on the terminating side.

A H.248 context with its terminations, and the related mapping information, has its own lifecycle: created at session setup, modified when needed, and deleted upon session termination. Context status tracking is thus unavoidable since in case of a H.248 "event", the respective Request-Reply messages carry only partial information, i.e., not necessarily contain all context data, but only what is changed/new. Hence, the mapping information might be present in a combination of the present and past "records", and mapping by the correlator 502 would not be possible without keeping track of past events. The proposed multiple mapping correlation method needs to keep track of context data, and modify it upon the following events:

call initiation (session setup): the relevant information must be stored session modification: if the relevant information has changed (or missing piece of information added), it should overwrite (or extend) the previously stored mapping information call release (session termination): the previously stored mapping information must be removed from the correlation logic The H.248 context status tracking by the Iq probe 508 is based on the relevant Context ID, which is permanent throughout the context lifecycle and present in all H.248 messages. The Context ID is accompanied by the Gateway ID, since the Context ID unique only on gateway level. The "most stateless" operation might be achieved when newly arrived information always overwrites earlier data. The data record for an individual H.248 context is as follows:

Context ID (unique on Gateway level)
Gateway ID (unique on Network level)
Repeated for each (typically) terminations:
    Termination ID
    Direction (network-side or UE-side)
    Local IP address and port
    Remote IP address and port Based on the above observations, an efficient data acquisition by the Iq probe 508 and, thus, the acquisition/correlation system 100 as a whole can be achieved. In particular, the context information can be updated or deleted in accordance with any session- or flow-related events.

While the present disclosure has been described above with respect to preferred embodiments, it will be readily apparent that these embodiments can be combined to arrive at further embodiments of the present disclosure.

The invention claimed is:

1. A system for acquiring and correlating session-related information from an Internet Protocol Multimedia Subsystem, IMS, the system comprising:
   memory; and
   processor, the system being configured to:
   acquire control plane information from control plane signalling tapped at a Proxy Call Session Control Function, P-CSCF;
   acquire user plane information from user plane traffic tapped at an access gateway, AGW;
   acquire context information from signalling tapped at an Iq interface between the P-CSCF and the AGW;
   correlate the control plane information and the user plane information acquired for a particular session using the acquired context information, wherein
   the system is configured to perform one or more of the followings:
   determining one or more key performance indicators of a network based on the correlated information;
   maintaining one or more statistical counters based on the correlated information;
   performing root-cause analysis based on the correlated information; and
   generating event data based on the correlated information.

2. The system of claim 1, wherein
the acquired control plane information comprises at least one of a port and an IP address of the AGW, and
the acquired user plane information comprises at least one of a port and an IP address of a user terminal.

3. The system of claim 2, wherein
the acquired context information establishes a mapping between at least one of the port and the IP address of the AGW, and at least one of the port and the IP address of the user terminal.

4. The system of claim 1, wherein
the acquired control plane information relates to IMS sessions,
the acquired user plane information relates to data flows of the IMS sessions, and
the acquired context information permits to correlate at least one IMS session and at least one data flow underlying the particular session.

5. The system of claim 1, wherein
the tapped signalling between the P-CSCF and the AGW relates to setup of the particular session.

6. The system of claim 1, wherein
the tapped signalling between the P-CSCF and the AGW conforms to ITU-T H.248.

7. The system of claim 1, wherein
the tapped signalling between the P-CSCF and the AGW involves a transaction-based exchange of two or more messages between the P-CSCF and the AGW, and
the system is configured to acquire the context information for the particular session from two or more messages belonging to a single transaction.

8. The system of claim 7, wherein
the two or more messages comprise one message indicative of at least one of a port and an IP address of a user terminal and another message indicative of at least one of a port and an IP address of an access gateway, AGW, in charge of handling a session for the user terminal.

9. The system of claim 1, configured to:
continuously evaluate the tapped signalling between the P-CSCF and the AGW in regard to the context information previously acquired for the particular session to update or remove that context information.

10. The system of claim 1, wherein
the acquired session-related information relates to Voice over Internet Protocol sessions or Video over Internet Protocol sessions.

11. The system of claim 1, wherein
the system is configured to tap the control plane signalling at an Mw interface.

12. The system of claim 1, wherein
the system is configured to tap the user plane traffic at an Mb interface.

13. The system of claim 12, wherein
the Mb interface is located at an IMS access gateway, AGW, and faces a packet gateway outside the IMS.

14. The system of claim 1, wherein
the P-CSCF and the AGW are co-located at a single IMS site.

15. The system of claim 1, wherein the correlating the control plane information and the user plane information comprises:
establishing a mapping between the control plane information and the user plane information;
obtaining real time protocol (RTP) data associated with the user plane information;
generating data records with the RTP data; and
using the mapping, extending the data records with the control plane information.

16. The system of claim 15, wherein the correlating the control plane information and the user plane information further comprises:
obtaining IMS session data associated with the control plane information; and
further extending the extended data records with the IMS session data.

17. A network monitoring system comprising:
a system for acquiring and correlating session-related information from an Internet Protocol Multimedia Subsystem, IMS, the system comprising:
memory; and
processor, the system being configured to:
acquire control plane information from control plane signalling tapped at a Proxy Call Session Control Function, P-CSCF;
acquire user plane information from user plane traffic tapped at an access gateway, AGW;
acquire context information from signalling tapped at an Iq interface between the P-CSCF and the AGW; and
correlate the control plane information and the user plane information acquired for a particular session using the acquired context information, wherein
the system is configured to perform correlations for multiple sessions, and
a network analytics component is configured to individually analyze each of the multiple sessions based on the associated correlation, wherein
the network analytics component is configured to perform one or more of the followings:
determining one or more key performance indicators of a network based on the correlated information;
maintaining one or more statistical counters based on the correlated information;
performing root-cause analysis based on the correlated information; and
generating event data based on the correlated information.

18. A method of acquiring and correlating session-related information from an Internet Protocol Multimedia Subsystem, IMS, the method comprising:
acquiring control plane information from control plane signalling tapped at a Proxy Call Session Control Function, P-CSCF;
acquiring user plane information from user plane traffic tapped at an access gateway, AGW;
acquiring context information from signalling tapped at an Iq interface between the P-CSCF and the AGW; and
correlating the acquired control plane information and the acquired user plane information for a particular session using the acquired context information, wherein
the method further comprises performing one or more of the followings:
determining one or more key performance indicators of a network based on the correlated information;
maintaining one or more statistical counters based on the correlated information;
performing root-cause analysis based on the correlated information; and
generating event data based on the correlated information.

19. A computer program product comprising a non-transitory computer readable medium storing a computer program comprising code portions which, when executed by one or more processing devices, cause the one or more processing devices to carry out the method according to claim 18.

* * * * *